United States Patent [19]

Ogawa

[11] 4,051,623
[45] Oct. 4, 1977

[54] MOBILE RECONFIGURABLE ROBOT TOY

[75] Inventor: Iwakichi Ogawa, Kashiwa, Japan

[73] Assignee: Takara Co., Ltd., Tokyo, Japan

[21] Appl. No.: 694,316

[22] Filed: June 9, 1976

[51] Int. Cl.² ........................................... A63H 11/10
[52] U.S. Cl. ...................................... 46/103; 46/104; 46/120; 46/264
[58] Field of Search ................................ 46/103–105, 46/119, 120, 264–266

[56] References Cited

U.S. PATENT DOCUMENTS

| 3,128,575 | 4/1964 | Stanetzki | 46/120 |
| 3,553,885 | 1/1971 | Tazaka | 46/116 |
| 3,564,763 | 2/1971 | Cleveland et al. | 46/116 |
| 3,587,191 | 6/1971 | Cooper | 46/264 |
| 3,648,408 | 3/1972 | Terzian | 46/265 |
| 3,961,440 | 6/1976 | Saito | 46/104 |

Primary Examiner—Louis G. Mancene
Assistant Examiner—Robert F. Cutting
Attorney, Agent, or Firm—Jackson & Jones

[57] ABSTRACT

A toy is provided configurable as a robot whose appendages are press-fit attached to the body and may be removed and attached to other press-fit connection points located on the body or on other complimentary toy assemblies to form various other toy configurations. Locomotion of the toy is facilitated by endless treads mounted on triangular shaped carriages. The carriages are rotatable about a fixed point on the robot body, and the treads are driven by an electric motor mounted within the body through a gear train assembly. The gear train assembly also provides rotating press-fit connections at other points on the body member. The robot body may be fitted with a stylized robot head having a pivoted section, which, in a pivoted position, converts the head into a seat for supporting a doll figure.

11 Claims, 2 Drawing Figures

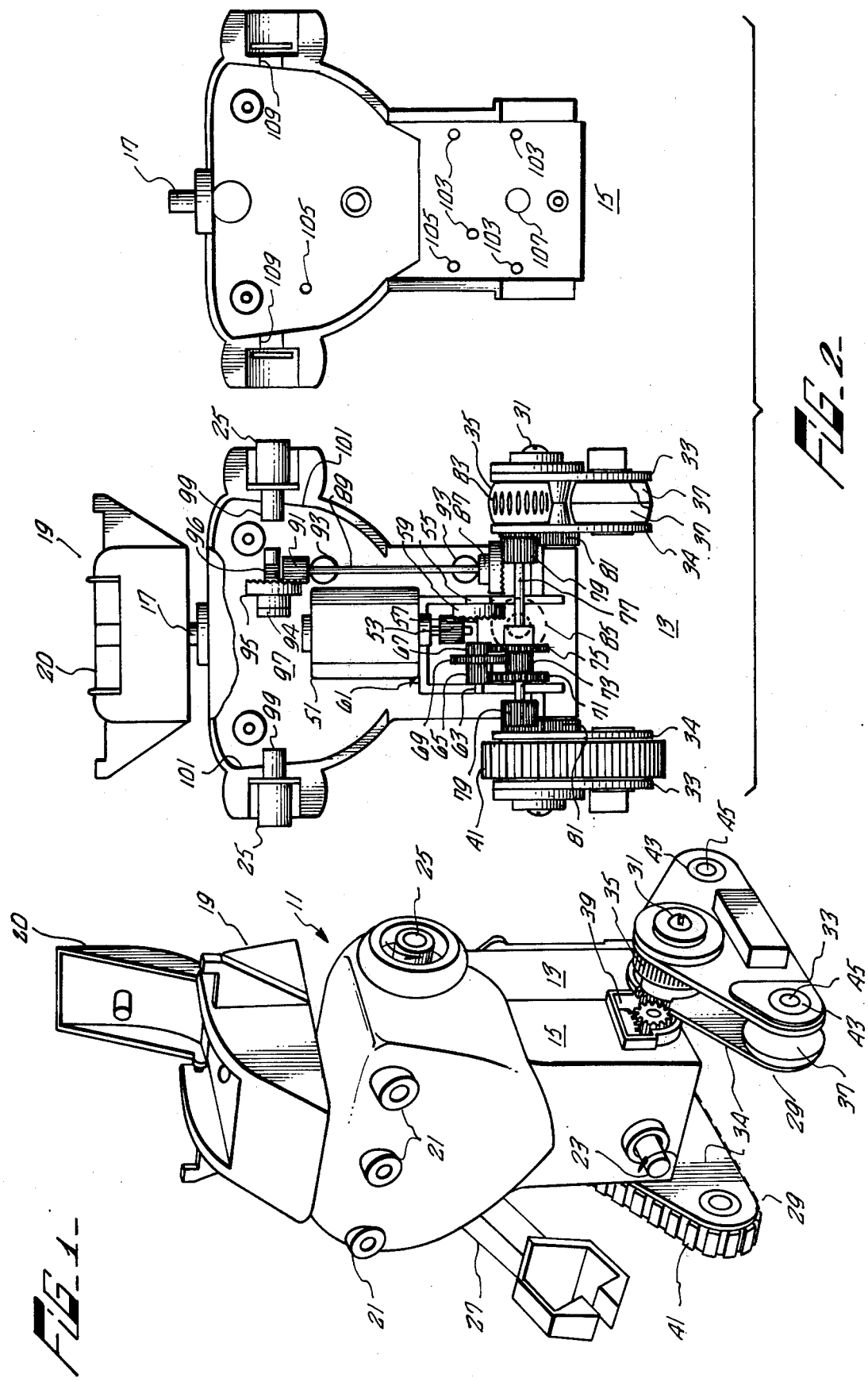

MOBILE RECONFIGURABLE ROBOT TOY

BACKGROUND OF THE INVENTION

1. Field of the Invention

The subject invention relates to toys and more particularly to a toy which may be assembled and disassembled to form a variety of configurations.

2. Description of the Prior Art

The toy industry has provided a large number of toy doll assemblies having various degrees of independent locomotion and remote controlled motion. For example, U.S. Pat. No. 3,267,607 discloses a doll having a drive mechanism mounted in its torso for pivotally moving leg members. U.S. Pat. No. 3,038,275 describes a self-walking doll having individual motors in each foot which are alternately driven.

To date, the known prior art has not provided a robot assembly that is compatible with a line of complimentary toys and is capable of being broken into several subcomponents compatible with separate toy subassemblies.

SUMMARY OF THE INVENTION

It is an object of the invention to provide a toy having a number of parts of varying geometric shapes which may be combined to form a robot like object or a number of other interesting futuristically shaped toys. It is another object of the invention to provide locomotion at a number of points in the various configurations. It is another object to include the above features in an easily assemblable toy.

These and other objects of the invention are accomplished by providing a base member with a number of apertures in which a number of other elements may be fitted to form a toy which may initially appear as a robot. The parts may be then detached and reattached at other locations on the body member and the orientation of the body itself altered if desired to form other toy configurations.

As an additional feature, motion may be provided to various points of the body by means of a motor and gear train network located within the body. Locomotion of the body from certain of these drive points may be provided by a gear-driven tread assembly.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1 is a perspective view of one configuration of the preferred embodiment of the invention.

FIG. 2 is a view illustrating respective halves of the body of the preferred embodiment of FIG. 1.

DETAILED DESCRIPTION OF THE PREFERRED EMBODIMENT

The following description is provided to enable any person skilled in the toy industry to make and use the invention and it sets forth the best modes contemplated by the inventor of carrying out this invention. Various modifications, however, will remain readily apparent to those skilled in the above art, since the generic principals of the present invention are applied herein specifically to provide a relatively economical and easily manufactured mobile reconfigurable robot toy.

As illustrated in FIG. 1, the preferred embodiment of the invention comprises a number of elements attached to a base or body member 11, which separates into a front portion 15 and a rear portion 13. The front portion 15 of the body 11 has a plug 17 on which a stylized robot head 19 may be press-fitted by means of the aperture on the underside of the head 19. The head 19 may have a section 20 which pivots away to form a seat for a toy figure as illustrated in FIG. 2. The front 15 of the body 11 also includes a number of front apertures 21 and a rotating press-fit plug 23. Rotating press-fit apertures 25 are provided at the shoulder locations of the body 11. These apertures may receive a number of elements bearing a press-fit plug, for example a mechanical arm 27.

Locomotion of the body 11 in various positions is enabled by two tread drive carriages 29 pivotally attached by means of pins 31 to the rear body member 13. Each assembly 29 includes a pair of triangular-shaped carriage members 33, 34 within which are mounted a drive roller 35 and two idler rollers 37. Each drive roller 35 is mounted on a pin 31 and fits flush against the side of the body 11, extending through the triangular member 34. This drive roller 35 is driven by a gear means extending out of an opening 39 of the body 11. The rollers 35, 37 are ribbed to contact a smooth-bottomed, elastic tread member 41. The idler rollers 37 are mounted on spindles 43 and have press-fit apertures 45. The drive carriages thus provided may be pivoted to reorient the body member and may provide drives to other accessories connected thereto.

The driving mechanism for providing rotation of the rotating apertures 25, the rotating plug 23 and the drive rollers 35 is shown in detail in FIG. 2. Driving power is provided by an electric motor 51 energized from a pair of batteries. Three externally communicating drive shafts are provided and are driven through interior gear train shafts. A salient feature of the gear system to be described is that the shafts and accompanying gears may be simply inserted into bearing surfaces molded in a body member half and retained by restraints applied when the other body member half is attached. The particular gear structure will not be described in detail with reference to FIG. 2.

Drive to the carriage members 29 is provided through gears mounted on two shafts 57, 77. The motor drive gear 53 drives a bevelled gear 55 mounted on the first shaft 57. The rear portion 59 of the gear 55 rotates in a rectangular mounting 61, as does the end 63 of the first shaft 57. Additionally, the first shaft 57 bears three gears 65, 67, and 69 which transmit drive to three gears 71, 73, and 75 on the second shaft 77 mounted in the mounting 61. The two gears 65, 67 on the first shaft 57 are identical to the gear 73 mounted on the second shaft 77, and the two gears 71, 75 on the second shaft are identical to the gear 69 mounted on the first shaft 57. Each gear pair 69, 67 and 71, 73 is integrally formed and mounted to rotate on their respective shafts 57 and 77 such that a speed reduction occurs between the fixed gears 65, 75. Finally, two gears 79, 80 are mounted at opposite ends of the second shaft 77 for actuating the drive rollers 35.

As shown, each drive roller 35 has a toothed portion 81 which extends through the carriage member 34 to mesh with one of the gears 79, 80. To aid in transmission of drive force to the treads 41, the surface 84 of each drive roller 35 is curved with respect to its axis and has cuts 83 made parallel to its axis to result in a ridged surface. Similarly, the idler rollers 37 are also ridged and curved in cross section.

Rotation of the rotating apertures 25 is provided by means of a drive train including a third shaft 89 and a fourth shaft 97. The third shaft 89 bears two gears 87, 91 at its opposite ends and is mounted into bearing plugs 93 such that the surface of the shaft 89 is flush with the flat tops of the bearing plugs 93.

To translate the drive provided by shaft 89 to a drive on a perpendicular axis, a gear 91 is located on the third shaft 89. This gear 91 drives a gear 95 mounted on the fourth shaft 97 rigidly attached to the two rotating apertures 25. The fourth shaft 97 is retained by positioning the two cylinders 99 on the rear portion of the rotating apertures 25 in semi-circular ridges 101 on the body member 13. The gear 91 is retained on the shaft 97 by a spring 96 which exerts an axial force pressing the gear into a fixed hub 94. Thus, if one of the apertures 25 is prevented from rotating by a tight fitting connection, the spring action will be overcome and the gear 95 will be driven around the fixed shaft 97.

Lastly, to rotate the rotating shaft or plug 23, an attached gear 85 is employed. An aperture 107 in the second body half 17 aligns this gear 85 to mesh with the gear 75 on the second shaft 77. It may be noted that all of gear mounting locations described above may be molded as a part of the rear body members 15 13 to provide for ease of assembly.

In operation, the various shafts just described are simultaneously rotated when the motor 51 is energized. Driving force is first converted to rotation parallel to the second shaft 77 and transmitted to the second shaft 77 by the gears 55, 63, 65, 67, mounted on the first shaft 57. The second shaft 77 then serves to provide drives to the carriage assemblies 29, to the rotating plug shaft 23 and to the press-fit apertures 25 mounted in the shoulder area of the body member. This latter drive is transmitted via the third shaft 89 to the fourth shaft 97. In achieving this transmission to the fourth shaft 89, the gear 79 performs a dual function, driving both a roller 35 and a gear 87. The clutching spring 95 on the fourth shaft permits members, for example, mechanical arms, to be tightly mounted at the shoulder locations fixing the shaft 97 without locking the rest of the gear train.

As alluded to earlier, when the body member front portion 15 is mounted on the rear portion 13, the various shafts and associated gear assemblies are fixed into position. Four pins 103 in the front body member 15 fit against the shafts 77, 57 mounted on the rectangular mounting 63 to maintain the shafts 57, 77 in position. Two additional pins 105 similarly maintain the shaft 89 in position. The aperture 107 fits down over the rotating plug 23 to maintain the gear 85 flush in proper contact with the gear 75. Lastly, complimentary semicircular cutouts 109 serve to retain the cylinders 99 of the rotating apertures 25.

The just described preferred embodiment of the invention provides a toy which may be assembled in a number of configurations which challenges the imagination. Any number of accessory members such as the mechanical arm 21 or robot head 19 may be constructed with press-fit plugs or apertures and then attached at various stationary and rotating plug locations of the preferred embodiment. Additionally the carriages 29 may be pivoted to any orientation relative to the body 11 as desired.

As should be apparent, many modifications may be made in the preferred embodiment discussed above without departing from the spirit and scope of the invention. Therefor it is to be understood that, within the scope of the appended claims, the invention may be practiced other than as specifically described above.

What is claimed is:

1. A toy to which a plurality of pressfittable parts may be attached to form various configurations comprising:
   a body member having a plurality of openings therein;
   a plurality of shafts, each one mounted for rotation in at least one of said plurality of openings;
   means within said body member for driving each of said plurality shafts;
   means attached to at least one of said shafts for removably press-fit connecting one of said press-fittable parts; and
   first and second carriage members pivotally mounted to said body member, each said carriage member bearing means driven by at least one of said plurality of shafts for translating said body member.

2. The toy of claim 1 wherein said body member further includes a plurality of stationary press-fit attachment means for attaching said press-fittable parts to said body member.

3. The toy of claim 1 wherein said body member resembles a torso, and wherein a first of said plurality of shafts is disposed to provide a rotating drive at respective shoulder openings of said torso, wherein a second of said plurality shafts is disposed to provide a rotating drive at openings at either side of the lower extremity of said torso and wherein a third of said plurality of shafts is disposed to provide a rotating drive on an axis perpendicular to that of said second shaft at the lower front extremity of said torso.

4. The toy of claim 3 wherein said second shaft mounts first and second gears at its opposite ends for transmitting drive to said translating means and a third gear between said first and second gears, said third gear providing a drive to said third shaft.

5. The toy of claim 1 further including:
   a press-fit connection means disposed on said body member; and
   a robot head press-fittable on said body member in conjunction with said press-fit connection means and having a pivoted section which when pivoted converts said robot head into a seat wherein a toy figure may be mounted.

6. A toy comprising:
   a body member having a motor mounted therein and a plurality of apertures;
   a plurality of shafts rotatably mounted within said body member such that a shaft end extends into each of said apertures;
   gear means within said body member for transmitting motor drive from said motor to each of said plurality of shafts;
   first and second carriage means on said body member, each carriage means for imparting motion to said body member, and pivotally mounted to said body member for assuming a plurality of driving orientations with respect to said body member; and
   means cooperating with at least one of said shafts for transmitting motor drive to said motion imparting means.

7. The toy of claim 6 wherein a second of said shafts further includes means permitting said second shaft to be locked in place without locking said gear means.

8. The toy of claim 6 wherein said body member comprises first and second halves, the first half including means for mounting said gear means and the second half including means for retaining said gear means in said mounting means.

9. The toy of claim 6 wherein at least one of said carriage means includes means for providing a rotating press-fit connection.

10. A toy comprising:
a torso member;
first shaft means for providing rotatable pressfit connections at first and second shoulder locations of said torso;
second shaft means for providing first and second drives at the respective first and second sides of the lower extremity of said torso;
third shaft means for providing a press-fit connectable rotating drive on an axis perpendicular to that of said second shaft means;
first and second carriage members pivotally mounted on said torso;
first and second tread means rotatably mounted on said first and second carriage members respectively;
means cooperating with said first and second drives of said second shaft means for respectively driving said first and second tread means; and
means for rotating each of said first, second and third shaft means.

11. The toy of claim 8 wherein said first shaft means comprises a single shaft and wherein said means for rotating includes a spring-biased gear on said single shaft for permitting said shaft to be fixed in position while said gear rotates.

* * * * *

UNITED STATES PATENT OFFICE
CERTIFICATE OF CORRECTION

PATENT NO. : 4,051,623
DATED : October 4, 1977
INVENTOR(S) : Iwakichi Ogawa

It is certified that error appears in the above–identified patent and that said Letters Patent are hereby corrected as shown below:

Column 2, line 45 delete "not" and insert --now--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*